(12) United States Patent
Tanaka et al.

(10) Patent No.: US 6,679,046 B2
(45) Date of Patent: Jan. 20, 2004

(54) SINGLE-SHAFT COMBINED PLANT

(75) Inventors: Satoshi Tanaka, Takasago (JP);
Miharu Matsuoka, Takasago (JP)

(73) Assignee: Mitsubishi Heavy Industries, Ltd.,
Tokyo (JP)

( * ) Notice: Subject to any disclaimer, the term of this patent is extended or adjusted under 35 U.S.C. 154(b) by 20 days.

(21) Appl. No.: 10/173,857

(22) Filed: Jun. 19, 2002

(65) Prior Publication Data

US 2003/0014962 A1 Jan. 23, 2003

(30) Foreign Application Priority Data

Jul. 9, 2001 (JP) ...................................... 2001-207266

(51) Int. Cl.[7] .............................................. F02C 6/18
(52) U.S. Cl. ................................. 60/39.091; 60/39.182
(58) Field of Search ........................ 60/39.091, 39.182, 60/39.13, 786

(56) References Cited

U.S. PATENT DOCUMENTS 4,969,324 A    11/1990  Woodson
5,148,668 A  *  9/1992  Frutschi .................. 60/39.182

FOREIGN PATENT DOCUMENTS

| DE | 44 26 354 | 2/1996 |
|---|---|---|
| EP | 0 465 137 | 1/1992 |
| JP | 8-177414 | 7/1996 |
| JP | 10-184317 | 7/1998 |

* cited by examiner

Primary Examiner—Michael Koczo
(74) Attorney, Agent, or Firm—Oblon, Spivak, McClelland, Maier & Neustadt, P.C.

(57) ABSTRACT

A single-shaft combined plant having an emergency shut-off oil system is provided. The emergency shut-off oil system is constituted such that when a steam governing valve tripping electromagnetic valve is opened, only a steam turbine is stopped; a master tripping electromagnetic valve is connected to a fuel gas control valve emergency shut-off oil line, a fuel oil control valve emergency shut-off oil line, and a steam governing valve emergency shut-off oil line via check valves; and when the master tripping electromagnetic valve is opened, both the steam turbine and a gas turbine are stopped. Thus, only the steam turbine can be stopped. Even if a tripping valve provided on the fuel gas control valve emergency shut-off oil line or the fuel oil control valve emergency shut-off oil line does not open because of a breakdown, the gas turbine can be stopped reliably.

1 Claim, 4 Drawing Sheets

SINGLE-SHAFT COMBINED PLANT

The entire disclosure of Japanese Patent Application No.2001-207266 filed on Jul. 9, 2001 including specification, claims, drawings and summary is incorporated herein by reference in its entirety.

BACKGROUND OF THE INVENTION

1. Field of the Invention

This invention relates to a single-shaft combined plant having a gas turbine and a steam turbine connected by a single shaft. More specifically, the invention relates to the single-shaft combined plant useful when a clutch is interposed between the gas turbine and the steam turbine.

2. Description of Related Art

A single-shaft combined plant, having a gas turbine and a steam turbine connected by a single shaft, is a plant with a high efficiency, involving minimal emission of hazardous substances (NOX, etc.), and flexibly accommodating diurnal changes in electric power consumption.

FIG. 3 is a configuration diagram of a conventional single-shaft combined plant. As shown in this drawing, a gas turbine 1 and a steam turbine 2 are connected by a single shaft 3, and an electric generator (hereinafter referred to as a generator) 4 is also connected to the shaft 3. Both a gas and an oil are available as fuels for the gas turbine 1, and a fuel gas control valve 6 is provided on a fuel gas supply line 5 leading to the gas turbine 1, while a fuel oil control valve 8 is provided on a fuel oil supply line 7 leading to the gas turbine 1. These control valves 6 and 8 have their valve opening adjusted by adjustment of control oil pressures (pressures of operating oils), to thereby control the amounts of the fuel gas and the fuel oil supplied to the gas turbine 1. A steam governing valve 10 is provided on a steam supply line 9 leading to the steam turbine 2. The steam governing valve 10 also has its valve opening adjusted by adjustment of a control oil pressure (pressure of an operating oil), to thereby control the amount of steam supplied to the steam turbine 2.

The above-described single-shaft combined plant is provided with an emergency shut-off oil system as shown in the drawing. That is, a fuel gas control valve emergency shut-off oil line 11 for shutting off the fuel gas control valve 6, and a fuel oil control valve emergency shut-off oil line 12 for shutting off the fuel oil control valve 8 are present as gas turbine emergency shut-off oil lines. A fuel gas control valve tripping electromagnetic valve 13 is provided on the fuel gas control valve emergency shut-off oil line 11, while a fuel oil control valve tripping electromagnetic valve 14 is provided on the fuel oil control valve emergency shut-off oil line 12.

Thus, only the fuel gas control valve tripping electromagnetic valve 13 is closed (energized) to establish an emergency shut-off oil pressure for the fuel gas control valve 6. As a result, the amount of the fuel gas supplied can be controlled by the fuel gas control valve 6. When the fuel oil control valve tripping electromagnetic valve 14 is deenergized, the gas turbine 1 can be operated by the fuel gas. On the other hand, only the fuel oil control valve tripping electromagnetic valve 14 is closed (energized) to establish an emergency shut-off oil pressure for the fuel oil control valve 8. As a result, the amount of the fuel oil supplied can be controlled by the fuel oil control valve 8. When the fuel gas control valve tripping electromagnetic valve 13 is deenergized, the gas turbine 1 can be operated by the fuel oil.

A steam governing valve emergency shut-off oil line 15 for shutting off the steam governing valve 10 is provided as a steam turbine emergency shut-off oil line. A steam governing valve tripping electromagnetic valve 16 is provided on the steam governing valve emergency shut-off oil line 15. When steam is to be supplied to the steam turbine 2, the steam governing valve tripping electromagnetic valve 16 is closed (energized) to establish an emergency shut-off oil pressure for the steam governing valve 10. As a result, the amount of steam supplied can be controlled by the steam governing valve 10.

The steam governing valve tripping electromagnetic valve 16 is also connected to the fuel gas control valve emergency shut-off oil line 11 and the fuel oil control valve emergency shut-off oil line 12 via check valves 17 and 18. The check valve 17 allows the flow of an emergency shut-off oil from the fuel gas control valve emergency shut-off oil line 11 toward the steam governing valve tripping electromagnetic valve 16, but blocks its flow in the reverse direction, as indicated by arrows in the drawing. The check valve 18 allows the flow of an emergency shut-off oil from the fuel oil control valve emergency shut-off oil line 12 toward the steam governing valve tripping electromagnetic valve 16, but blocks its flow in the reverse direction, as indicated by arrows in the drawing.

The tripping electromagnetic valves 13, 14 and 16 of the emergency shut-off oil system are actuated by a protective interlock circuit (not shown) in the manner described below.

When the gas turbine 1 is to be operated by the fuel gas, only the fuel gas control valve tripping electromagnetic valve 13 is closed (energized) to enable only the fuel gas control valve 6 to work. On this occasion, the fuel oil control valve tripping electromagnetic valve 14 is kept open (unenergized) to prevent the fuel oil from being accidentally supplied to the gas turbine 1. When the gas turbine 1 is to be operated by the fuel oil, on the other hand, only the fuel oil control valve tripping electromagnetic valve 14 is closed (energized) to enable only the fuel oil control valve 8 to work. On this occasion, the fuel gas control valve tripping electromagnetic valve 13 is kept open (unenergized) to prevent the fuel gas from being accidentally supplied to the gas turbine 1.

With the conventional single-shaft combined plant, the gas turbine 1 and the steam turbine 2 are started together. For this purpose, the fuel gas control valve tripping electromagnetic valve 13 or the fuel oil control valve tripping electromagnetic valve 14 is closed (energized) to start the gas turbine 1. At the same time, the steam governing valve tripping electromagnetic valve 16 is also closed (energized) to make the steam governing valve 10 operable, thereby starting the steam turbine 2 as well.

When the gas turbine 1 is to be stopped, the energized fuel gas control valve tripping electromagnetic valve 13 (or the fuel oil control valve tripping electromagnetic valve 14) is opened to release the emergency shut-off oil from the fuel gas control valve 6 (or the fuel oil control valve 8) via the fuel gas control valve emergency shut-off oil line 11 (or the fuel oil control valve emergency shut-off oil line 12). As a result, the control oil (operating oil) escapes to shut off the fuel gas control valve 6 (or the fuel oil control valve 8), thereby stopping the supply of the fuel gas (or the fuel oil). When the steam turbine 2 is to be stopped, the energized steam governing valve tripping electromagnetic valve 16 is also opened to release the emergency shut-off oil from the steam governing valve 10 via the steam governing valve emergency shut-off oil line 15. As a result, the control oil (operating oil) escapes to shut off the steam governing valve 10, thereby stopping the supply of steam.

With the conventional single-shaft combined plant, moreover, it is not common practice to stop only the steam turbine 2 while keeping the gas turbine 1 working. Therefore, the steam governing valve tripping electromagnetic valve 16 is connected to the fuel gas control valve emergency shut-off oil line 11 and the fuel oil control valve emergency shut-off oil line 12 via the check valves 17 and 18, as described above. Because of this structure, when the steam governing valve tripping electromagnetic valve 16 is opened (deenergized), not only the emergency shut-off oil of the steam governing valve 10, but also the emergency shut-off oils of the fuel gas control valve 6 and the fuel oil control valve 8 are released to shut off the fuel gas control valve 6 and the fuel oil control valve 8. By these means, the gas turbine 1 and the steam turbine 2 can be reliably stopped at the same time. Thus, in case an accident occurs in the gas turbine 1, there can be prevented the event that the fuel gas control valve tripping electromagnetic valve 13 or the fuel oil control valve tripping electromagnetic valve 14 fails to open because of breakdown, thereby continuing the supply of the fuel gas or fuel oil to the gas turbine 1 to expand the scale of the accident.

Recently, demand has grown for a further decrease in the construction cost for the above-described single-shaft combined plant. The conventional single-shaft combined plant involved the following factors behind the cost increase:

(1) Since the gas turbine 1 and the steam turbine 2 are simultaneously started, there is need for a thyristor (starter) capable of generating a huge starting torque.

(2) Since the steam turbine 2 also rotates, together with the gas turbine 1, at the time of starting, cooling steam needs to be supplied to the steam turbine 2 so that the blades of the steam turbine 2 do not thermally expand because of windage loss. However, before the generator output by the gas turbine 1 increases, an exhaust gas boiler, which produces steam from the exhaust gas from the gas turbine 1, cannot form steam that can be charged into the steam turbine 2. Thus, until the exhaust gas boiler forms steam which can be charged into the steam turbine 2, there arises the necessity for an auxiliary boiler with a very high capacity enough to supply the steam turbine 2 with steam sufficient for cooling the steam turbine.

To reduce the construction cost, a proposal has now been made for a single-shaft combined plant, as shown in FIG. 4, which has a clutch 21 interposed between a gas turbine 1 (generator 4) and a steam turbine 2 to be able to connect and disconnect the gas turbine 1 and the steam turbine 2. With this single-shaft combined plant using the clutch 21, only the gas turbine 1 and the generator 4 are started, with the gas turbine 1 and the steam turbine 2 being disconnected from each other by the clutch 21. When the gas turbine 1 reaches a rated rotational speed, the generator 4 is connected to a power system. After connection of the generator 4 to the power system, steam, which is generated by an exhaust gas boiler (not shown) with the use of exhaust gas from the gas turbine 1, is supplied to the steam turbine 2 at a time when the steam becomes suppliable to the steam turbine 2, thereby starting the steam turbine 2. After the steam turbine 2 reaches a rated rotational speed, the clutch 21 is engaged to convey the torque of the steam turbine 2 to the generator 4.

According to the single-shaft combined plant using the clutch 21, only the gas turbine 1 and the generator 4 are started first, so that the capacity of the thyristor necessary for starting can be decreased (the capacity can be decreased in an amount corresponding to the weight of the steam turbine 2). Moreover, during a period for which only the gas turbine 1 and the generator 4 are operated, the steam turbine 2 rotates at a low speed, requiring no cooling steam. Thus, the capacity of the auxiliary boiler can be decreased.

However, when the clutch 21 is applied to the conventional single-shaft combined plant shown in FIG. 3 in order to decrease the capacity of the thyristor or the auxiliary gas boiler, the following problems arise:

(1) The single-shaft combined plant using the clutch 21 requires that only the gas turbine 1 is operated, while the steam turbine 2 can remain stopped. That is, when an operation is performed under a light load or no load, as in load shutdown or in an auxiliary load operation, it is impossible for the exhaust gas boiler to generate steam with a pressure and a temperature enough to be charged into the steam turbine 2. In this case, the conventional single-shaft combined plant can keep the steam turbine 2 rotated, together with the gas turbine 1, by supplying cooling steam from the auxiliary boiler to the steam turbine 2. With the single-shaft combined plant using the clutch 21, on the other hand, an auxiliary boiler with a sufficiently high capacity to generate cooling steam for the steam turbine is not provided (this can decrease the facility cost), as stated earlier. Thus, there is no choice but to stop only the steam turbine 2, if an operation is performed under a light load or without load. With the configuration of the emergency shut-off oil system shown in FIG. 3, however, when the steam governing valve tripping electromagnetic valve 16 is opened, not only the valve governing valve 10, but also the fuel gas control valve 6 and the fuel oil control valve 8 are shut off. Thus, it is impossible to stop only the steam turbine 2.

(2) If the steam governing valve emergency shut-off oil line 15 is separated from the fuel gas control valve emergency shut-off oil line 11 and the fuel oil control valve emergency shut-off oil line 12 without provision of the check valves 17 and 18, the following trouble may occur: Assume the fuel gas control valve tripping electromagnetic valve 13 or the fuel oil control valve tripping electromagnetic valve 14 fails to open because of breakdown when an accidence breaks out in the gas turbine 1. In this case, the gas turbine 1 cannot be stopped, and thus the gas turbine 1 is destroyed.

SUMMARY OF THE INVENTION

The present invention has been accomplished in light of the above-mentioned circumstances. Its object is to provide a single-shaft combined plant equipped with an emergency shut-off oil system, which can stop only a steam turbine, and which can stop a gas turbine reliably even if a tripping valve provided on a gas turbine emergency shut-off oil line (i.e., a fuel gas control valve tripping electromagnetic valve or a fuel oil control valve tripping electromagnetic valve) does not open because of a breakdown.

According to the present invention, there is provided a single-shaft combined plant comprising a gas turbine and a steam turbine connected together by a single shaft, and a clutch interposed between the gas turbine and the steam turbine, whereby the gas turbine and the steam turbine can be connected to or disconnected from each other, further comprising:

an emergency shut-off oil system including a gas turbine emergency shut-off oil line, and a steam turbine emergency shut-off oil line, and wherein when a tripping valve provided on the gas turbine emergency shut-off oil line is opened, an emergency shut-off oil is released from a valve provided on a fuel supply line via the gas turbine emergency shut-off oil line, whereby only the valve provided on the fuel supply line is shut off to stop supply of a fuel to the gas turbine, when a tripping valve provided on the steam turbine emergency shut-off oil line is opened, an emergency shut-off oil is released from a valve provided on a steam supply line via the steam turbine emergency shut-off oil line, whereby only the valve provided on the steam supply line is shut off to stop supply of steam to the steam turbine, a master tripping valve is connected to the gas turbine emergency shut-off oil line and the steam turbine emergency shut-off oil line via check valves, and when the master tipping valve is opened, the emergency shut-off oils are released from the valve provided on the fuel supply line and the valve provided on the steam supply line via the gas turbine emergency shut-off oil line and the steam turbine emergency shut-off oil line, whereby both the valve provided on the fuel supply line and the valve provided on the steam supply line are shut off to stop supply of the fuel to the gas turbine and supply of the steam to the steam turbine.

The single-shaft combined plant according to the present invention can solve the problems encountered when a clutch is applied to a single-shaft combined plant. That is, by opening only the tripping valve provided on the steam turbine emergency shut-off oil line, only the steam turbine can be stopped, with the gas turbine remaining in operation. Furthermore, in stopping both the gas turbine and the steam turbine, the master tripping valve is opened, whereby the gas turbine and the steam turbine can be stopped reliably. Thus, even if the tripping valve provided on the gas turbine emergency shut-off oil line does not open because of a breakdown when an accident happens to the gas turbine, for example, the gas turbine can be stopped safely. Consequently, a single-shaft combined plant can be produced at a lower cost than in the earlier technologies, by use of the clutch.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A preferred embodiment of the present invention will now be described in detail with reference to the accompanying drawings, which in no way limit the invention.

Figure 1:
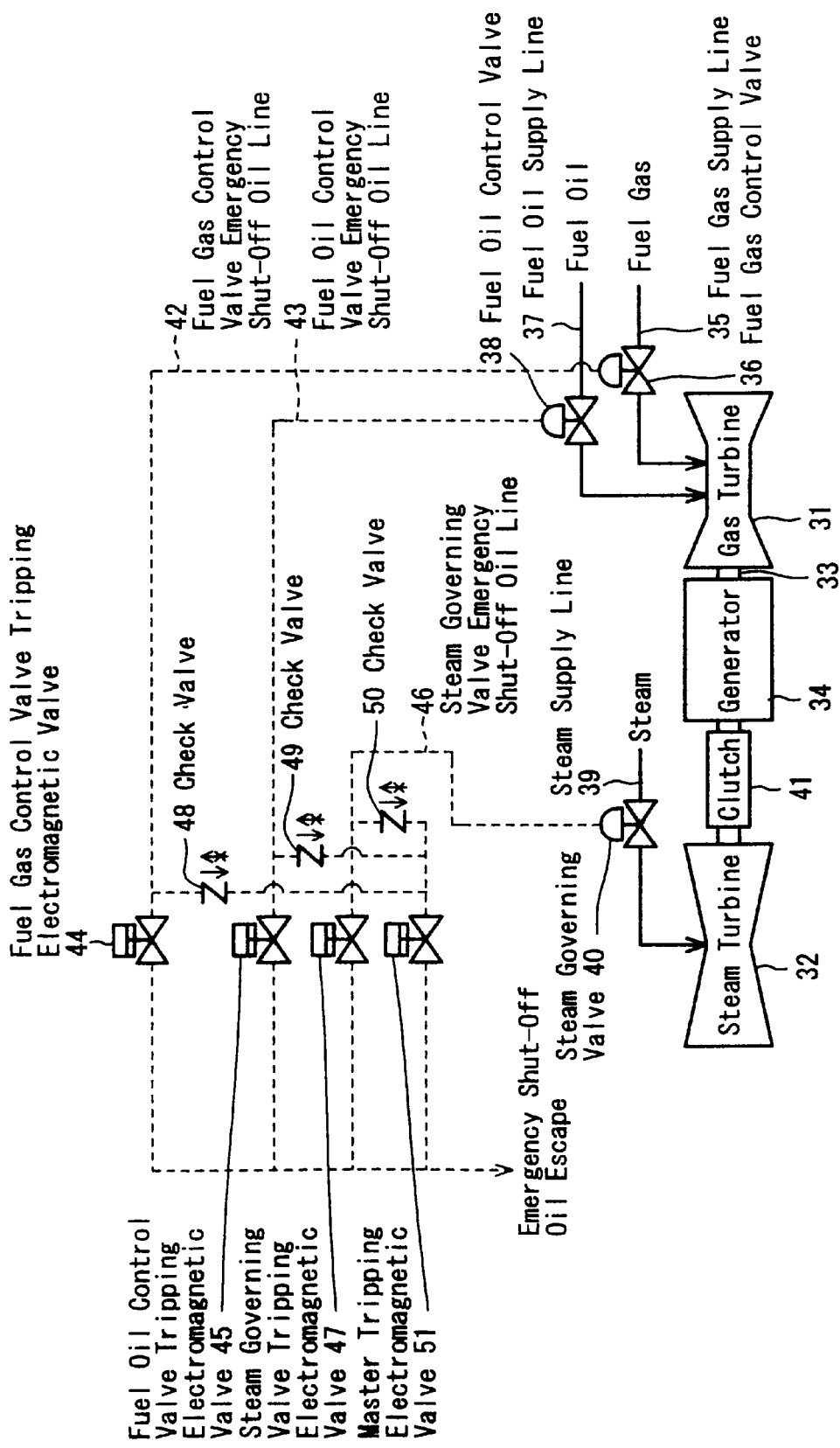
FIG. 1 is a configuration diagram of a single-shaft combined plant according to an embodiment of the present invention.
Figure 2:
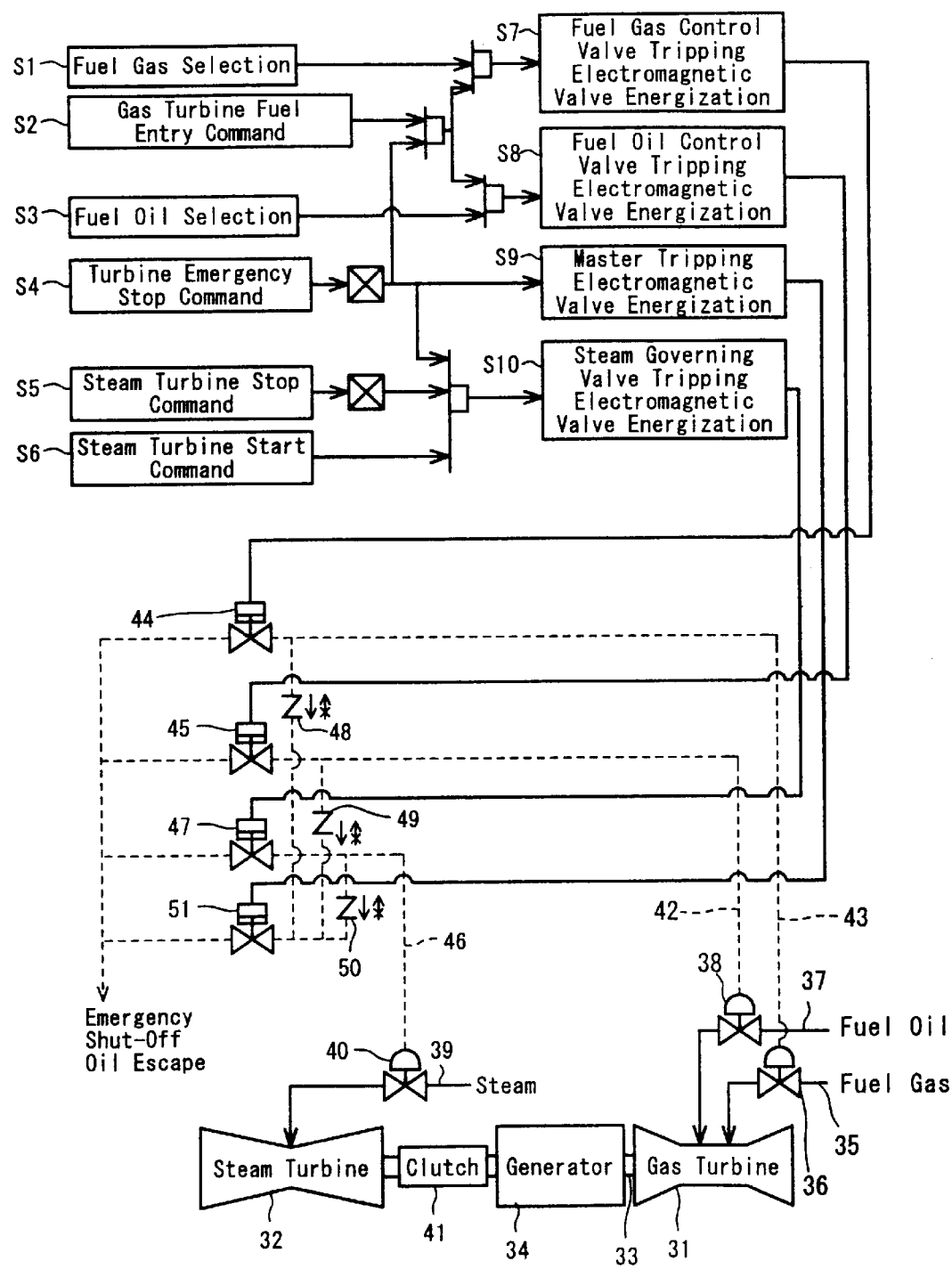
FIG. 2 is a protective interlock circuit diagram for actuating respective electromagnetic valves of an emergency shut-off oil system provided in the single-shaft combined plant.
Figure 3:
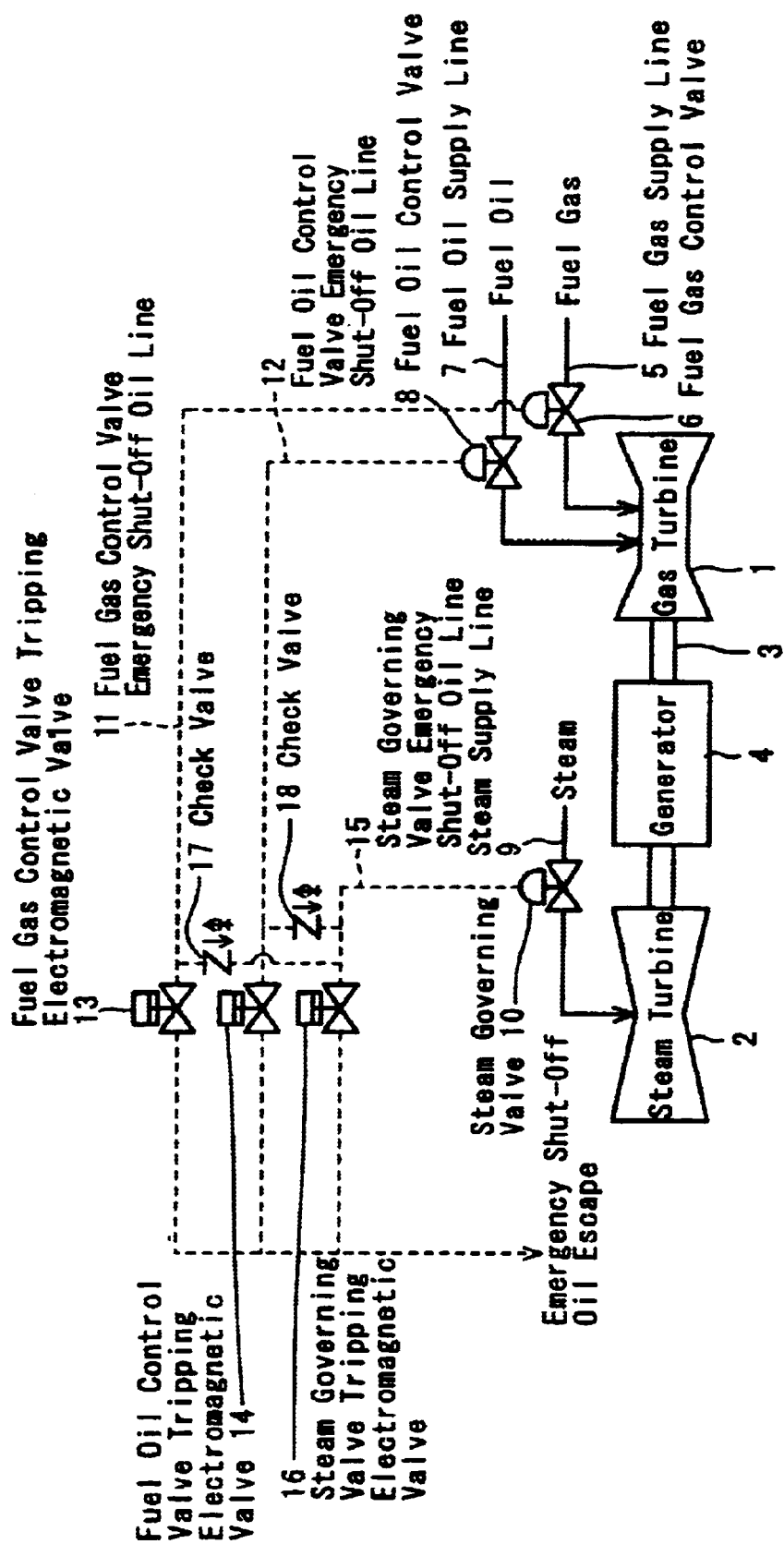
FIG. 3 is a configuration diagram of a conventional single-shaft combined plant.
Figure 4:
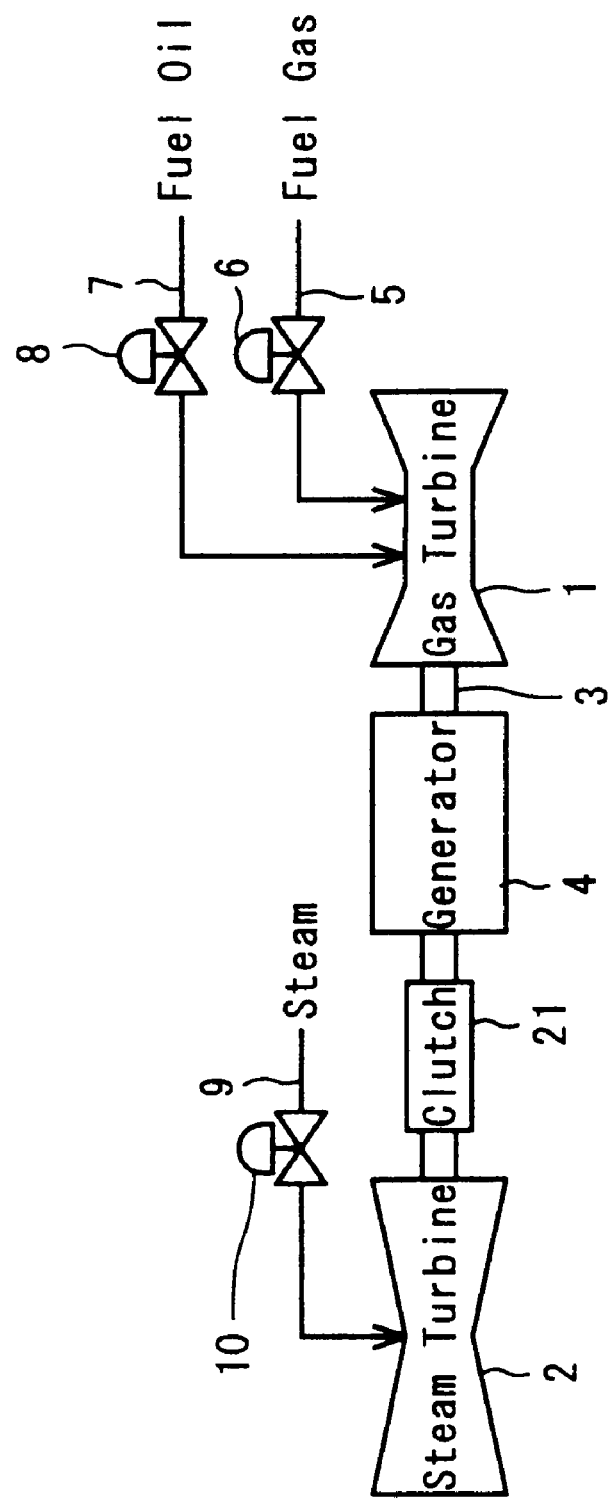
FIG. 4 is a configuration diagram of a single-shaft combined plant using a clutch.

FIG. 1 is a configuration diagram of a single-shaft combined plant according to an embodiment of the present invention. FIG. 2 is a protective interlock circuit diagram for actuating respective electromagnetic valves of an emergency shut-off oil system provided in the single-shaft combined plant.

As shown in FIG. 1, a gas turbine 31 and a steam turbine 32 are connected by a single shaft 33, and a generator 34 is also connected to the shaft 33. Both a gas and an oil are available as fuels for the gas turbine 31, and a fuel gas control valve 36 is provided on a fuel gas supply line 35 leading to the gas turbine 31, while a fuel oil control valve 38 is provided on a fuel oil supply line 37 leading to the gas turbine 31. These control valves 36 and 38 have their valve openings adjusted by adjustment of control oil pressures (pressures of operating oils), to thereby control the amounts of the fuel gas and the fuel oil supplied to the gas turbine 31. A steam governing valve 40 is provided on a steam supply line 39 leading to the steam turbine 32. The steam governing valve 40 also has its valve opening adjusted by adjustment of a control oil pressure (pressure of an operating oil), to thereby control the amount of steam supplied to the steam turbine 32.

A clutch 41 is interposed between the gas turbine 31 (generator 34) and the steam turbine 32, whereby the gas turbine 31 and the steam turbine 32 can be connected to or disconnected from each other. This contrivance makes the capacity of a thyristor or auxiliary boiler (not shown) small. As the clutch 41, a clutch using a helical spline fitting structure, or other type of clutch can be applied.

With this single-shaft combined plant using the clutch 41, only the gas turbine 31 and the generator 34 are started first, with the gas turbine 31 and the steam turbine 32 being disconnected from each other by the clutch 41. When the gas turbine 31 reaches a rated rotational speed, the generator 34 is connected to a power system. After connection of the generator 34 to the power system, steam, which is generated by an exhaust gas boiler (not shown) with the use of exhaust gas from the gas turbine 31, is supplied to the steam turbine 32 at a time when the steam becomes suppliable to the steam turbine 32, thereby starting the steam turbine 32. After the steam turbine 32 reaches a rated rotational speed, the clutch 41 is engaged to convey the torque of the steam turbine 32 to the generator 34.

The single-shaft combined plant using the clutch 41 is provided with an emergency shut-off oil system as shown in the drawing. That is, a fuel gas control valve emergency shut-off oil line 42 for shutting off the fuel gas control valve 36, and a fuel oil control valve emergency shut-off oil line 43 for shutting off the fuel oil control valve 38 are present as gas turbine emergency shut-off oil lines. A fuel gas control valve tripping electromagnetic valve 44 is provided on the fuel gas control valve emergency shut-off oil line 42, while a fuel oil control valve tripping electromagnetic valve 45 is provided on the fuel oil control valve emergency shut-off oil line 43.

Thus, only the fuel gas control valve tripping electromagnetic valve 44 is closed (energized) to establish an emergency shut-off oil pressure for the fuel gas control valve 36. As a result, the amount of the fuel gas supplied can be controlled by the fuel gas control valve 36. When the fuel oil control valve tripping electromagnetic valve 45 is deenergized in this state, the gas turbine 31 can be operated by the fuel gas. On the other hand, only the fuel oil control valve tripping electromagnetic valve 45 is closed (energized) to establish an emergency shut-off oil pressure for the fuel oil control valve 38. As a result, the amount of the fuel oil supplied can be controlled by the fuel oil control valve 38. When the fuel gas control valve tripping electromagnetic valve 44 is deenergized in this state, the gas turbine 31 can be operated by the fuel oil.

A steam governing valve emergency shut-off oil line 46 for shutting off the steam governing valve 40 in an emergency is provided as a steam turbine emergency shut-off oil line. A steam governing valve tripping electromagnetic valve 47 is provided on the steam governing valve emergency shut-off oil line 46. When steam is to be supplied to the steam turbine 32, the steam governing valve tripping electromagnetic valve 47 is closed (energized) to establish an emergency shut-off oil pressure for the steam governing valve 40. As a result, the amount of steam supplied can be controlled by the steam governing valve 40.

When the gas turbine 31 is to be stopped, the energized fuel gas control valve tripping electromagnetic valve 44 (or the fuel oil control valve tripping electromagnetic valve 45) is opened to release the emergency shut-off oil from the fuel gas control valve 36 (or the fuel oil control valve 38) via the fuel gas control valve emergency shut-off oil line 42 (or the fuel oil control valve emergency shut-off oil line 43). As a result, the control oil (operating oil) escapes to shut off the fuel gas control valve 36 (or the fuel oil control valve 38), thereby stopping the supply of the fuel gas (or the fuel oil). When the steam turbine 32 is to be stopped, the energized steam governing valve tripping electromagnetic valve 47 is opened to release the emergency shut-off oil from the steam governing valve 40 via the steam governing valve emergency shut-off oil line 46. As a result, the control oil (operating oil) escapes to shut off the steam governing valve 40, thereby stopping the supply of steam. Unlike the conventional single-shaft combined plant, the steam governing valve tripping electromagnetic valve 47, the fuel gas control valve emergency shut-off oil line 42, and the fuel oil control valve emergency shut-off oil line 43 are not connected by the check valves. In other words, the fuel gas control valve emergency shut-off oil line 42, the fuel oil control valve emergency shut-off oil line 43, and the steam governing valve emergency shut-off oil line 46 are independent of each other. Therefore, when the steam governing valve tripping electromagnetic valve 47 is opened, the emergency shut-off oil of the fuel gas control valve 36 or the fuel oil control valve 38 is not released, but only the steam turbine 32 is stopped.

In the single-shaft combined plant of the present embodiment, moreover, a master tripping electromagnetic valve 51 is connected to the fuel gas control valve emergency shut-off oil line 42, the fuel oil control valve emergency shut-off oil line 43, and the steam governing valve emergency shut-off oil line 46 via check valves 48, 49 and 50. The check valve 48 allows the flow of an emergency shut-off oil from the fuel gas control valve emergency shut-off oil line 42 toward the master tripping electromagnetic valve 51, but blocks its flow in the reverse direction, as indicated by arrows in the drawing. The check valve 49 allows the flow of an emergency shut-off oil from the fuel oil control valve emergency shut-off oil line 43 toward the master tripping electromagnetic valve 51, but blocks its flow in the reverse direction, as indicated by arrows in the drawing. The check valve 50 allows the flow of an emergency shut-off oil from the steam governing valve emergency shut-off oil line 46 toward the master tripping electromagnetic valve 51, but blocks its flow in the reverse direction, as indicated by arrows in the drawing.

An example of a protective interlock circuit for actuating the tripping electromagnetic valves 48, 49 and 50 of the emergency shut-off oil system will be described with reference to FIG. 2.

As shown in FIG. 2, if a fuel gas selection signal S1 exists in the presence of a gas turbine fuel entry command signal S2 and in the absence of a turbine emergency stop command signal S4, a fuel gas control valve tripping electromagnetic valve energization signal S7 is outputted to energize (close) the fuel gas control valve tripping electromagnetic valve 44. If a fuel oil selection signal S3 exists in the presence of the gas turbine fuel entry command signal S2 and in the absence of the turbine emergency stop command signal S4, a fuel oil control valve tripping electromagnetic valve energization signal S8 is outputted to energize (close) the fuel oil control valve tripping electromagnetic valve 45. When there is no turbine emergency stop signal S4, a master tripping electromagnetic valve energization signal S9 is outputted to energize (close) the master tripping electromagnetic valve 51. If a steam turbine energization command signal S6 exists in the absence of the turbine emergency stop signal S4 and in the absence of a steam turbine stop command signal S5, a steam governing valve tripping electromagnetic valve energization signal S10 is outputted to energize (close) the steam governing valve tripping electromagnetic valve 47.

When the steam turbine stop command signal S5 is generated in order to stop only the steam turbine 32 under a light load or no load, the steam governing valve tripping electromagnetic valve energization signal S10 becomes OFF to deenergize (open) the steam governing valve tripping electromagnetic valve 47, whereupon only the steam turbine 32 stops. When the turbine emergency stop command signal S4 is generated, the fuel gas control valve tripping electromagnetic valve energization signal S7, the fuel oil control valve tripping electromagnetic valve energization signal S8, and the steam governing valve tripping electromagnetic valve energization signal S10 become OFF to deenergize (open) the fuel gas control valve tripping electromagnetic valve 44, the fuel oil control valve tripping electromagnetic valve 45 and the steam governing valve tripping electromagnetic valve 47. Thus, the gas turbine 31 and the steam turbine 32 are stopped. In addition, the master tripping electromagnetic valve energization signal S9 also become OFF to deenergize (open) the master tripping electromagnetic valve 51. Consequently, the steam turbine 32 and the gas turbine 31 are stopped without fail.

As discussed above, the single-shaft combined plant according to the present embodiment can solve the problems encountered when a clutch is applied to a single-shaft combined plant. That is, by opening only the steam governing valve tripping electromagnetic valve 47, only the steam turbine 32 can be stopped, with the gas turbine 31 remaining in operation. Furthermore, in stopping both the gas turbine 31 and the steam turbine 32, the master tripping electromagnetic valve 51 is opened, whereby the gas turbine 31 and the steam turbine 32 can be stopped reliably. Thus, even if the fuel gas control valve tripping electromagnetic valve 44 or the fuel oil control valve tripping electromagnetic valve 45 does not open because of a breakdown when an accident happens to the gas turbine 31, for example, the gas turbine 31 can be stopped safely. Consequently, a single-shaft combined plant can be produced at a lower cost than in the earlier technologies, by use of the clutch 41.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:
1. A single-shaft combined plant comprising a gas turbine and a steam turbine connected together by a single shaft, and a clutch interposed between the gas turbine and the steam turbine, whereby the gas turbine and the steam turbine can be connected to or disconnected from each other, further comprising:

an emergency shut-off oil system including a gas turbine emergency shut-off oil line, and a steam turbine emergency shut-off oil line, and wherein when a tripping valve provided on the gas turbine emergency shut-off oil line is opened, an emergency shut-off oil is released from a valve provided on a fuel supply line via the gas turbine emergency shut-off oil line, whereby only the valve provided on the fuel supply line is shut off to stop supply of a fuel to the gas turbine, when a tripping valve provided on the steam turbine emergency shut-off oil line is opened, an emergency shut-off oil is released from a valve provided on a steam supply line via the steam turbine emergency shut-off oil line, whereby only the valve provided on the steam supply line is shut off to stop supply of steam to the steam turbine, a master tripping valve is connected to the gas turbine emergency shut-off oil line and the steam turbine emergency shut-off oil line via check valves, and when the master tripping valve is opened, the emergency shut-off oils are released from the valve provided on the fuel supply line and the valve provided on the steam supply line via the gas turbine emergency shut-off oil line and the steam turbine emergency shut-off oil line, whereby both the valve provided on the fuel supply line and the valve provided on the steam supply line are shut off to stop supply of the fuel to the gas turbine and supply of the steam to the steam turbine.

* * * * *